March 10, 1959    M. A. THOMPSON ET AL    2,876,710
RUG HOIST AND CONVEYOR

Filed April 18, 1958    2 Sheets-Sheet 1

INVENTORS
M. A. THOMPSON
R. D. THOMPSON
BY
ATTORNEY

March 10, 1959     M. A. THOMPSON ET AL     2,876,710
RUG HOIST AND CONVEYOR

Filed April 18, 1958     2 Sheets-Sheet 2

INVENTORS
M. A. THOMPSON
R. D. THOMPSON
BY
ATTORNEY

United States Patent Office 2,876,710
Patented Mar. 10, 1959

2,876,710

RUG HOIST AND CONVEYOR

Martin A. Thompson, Arlington, Calif., and Richard D. Thompson, Davenport, Iowa

Application April 18, 1958, Serial No. 729,326

8 Claims. (Cl. 104—89)

This invention relates to article-handling apparatus and more particularly to rug hoists and conveyors and has for a principal object certain modifications and improvements on the design forming the subject matter of the U. S. patent to Thompson 2,627,968.

In that patent is shown apparatus capable of hoisting rugs successively from the washing or cleaning room to elevated track means along which the rugs, in suspended fashion, are advanced in increments and ultimately discharged after being exposed to the proper drying treatment and time interval. Although that apparatus is fully automatic and has proved eminently successful, certain improvements have made themselves evident on the basis of experience therewith, and it is a significant object of this invention to embody those improvements in a modernized structure featuring simplicity, ease of operation and maintenance and economy in manufacture and installation. An important object is to utilize an endless chain conveyor or its equivalent travelling in a continuous cycle involving both hoisting of rugs successively to the overhead track and incremental advancing of the rugs along the track to an unloading zone. Other features reside in means guiding and directing the chain so as to place rug-carrying carriages successively on the track, means further directing the chain so as to disengage same from the carriages after the carriages have been placed on the track, means whereby successive carriages placed on the track will advance the series of track-supported carriages while the chain moves in bypassing relation to said series of carriages, means whereby the chain is ultimately redirected to pick up the carriage adjacent to the unloading zone and thence to carry said carriage to said zone, means for stripping rugs from the carriages as they pass successively through the unloading zone, improved rug-carrying carriages, means for effecting automatic engagement and disengagement between the carriages and chain, improved structure that may be readily tailored to and installed in existing buildings in association with washing and drying rooms, and such other objects and features as will become apparent from the following disclosure of a preferred embodiment of the invention, by way of example, as presented in the ensuing description and accompanying sheets of drawings, the several figures of which are described below.

Figure 1:
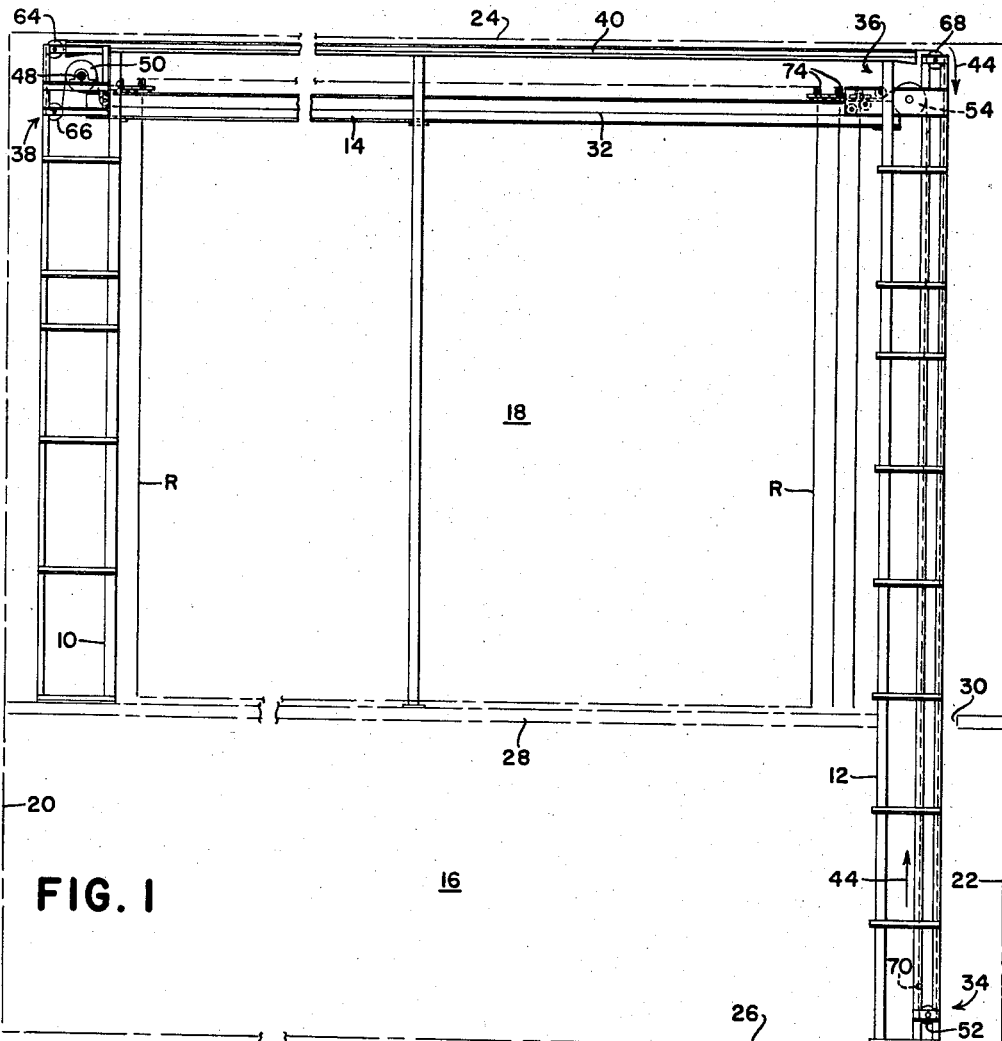
Figure 1 is an elevation of the apparatus, with building structure illustrated in broken lines.

The apparatus chosen for purposes of illustration and based on existing installations embodies appropriate framework 10 and 12 extending vertically to rigidly support an elongated fore-and-aft horizontal track made up here of a pair of laterally spaced apart I-beams 14. Building structure including a lower story affording a wash or cleaning room 16 and an upper story providing a drying room 18 is appropriately denoted by broken lines as including walls 20 and 22, an upper story ceiling 24, a wash room floor 26 and a separating floor 28 which has a slot or opening 30 therethrough through which the framework element 12 extends, it being noted that the other framework element 10 may be supported directly on the separating floor 28. It will be understood that details of the framework and mounting of the track may vary from one installation to the other; although, the general structural and functional principles will be observed. In general operation, a rug cleaning plant or its equivalent will entail rug washing or other cleaning in the wash room 16, elevation of the washed rugs through the slot or floor opening 30 and suspension of the rugs from the track 14 for drying in the drying room 18. The main purpose of the present invention is to provide an improved apparatus for handling the rugs, particularly in the transfer thereof from the wash room to the drying room and the subsequent transfer thereof from the drying track to areas from which the rugs may be removed conveniently for delivery to customers.

For purposes of clarity and convenience, the track will be spoken of in the singular and will be described as having a front end adjacent to the upper end of the framework element 12 and a rear end adjacent to the other framework element 10; although, it will be clear that these as well as other geographical terms do not limit the application of the invention. Moreover, equivalent structure may be readily employed in the exploitation of the invention and it is not intended, by the present disclosure of what is now a preferred embodiment of the invention, to limit the invention other than as required by the prior art.

Figure 4:
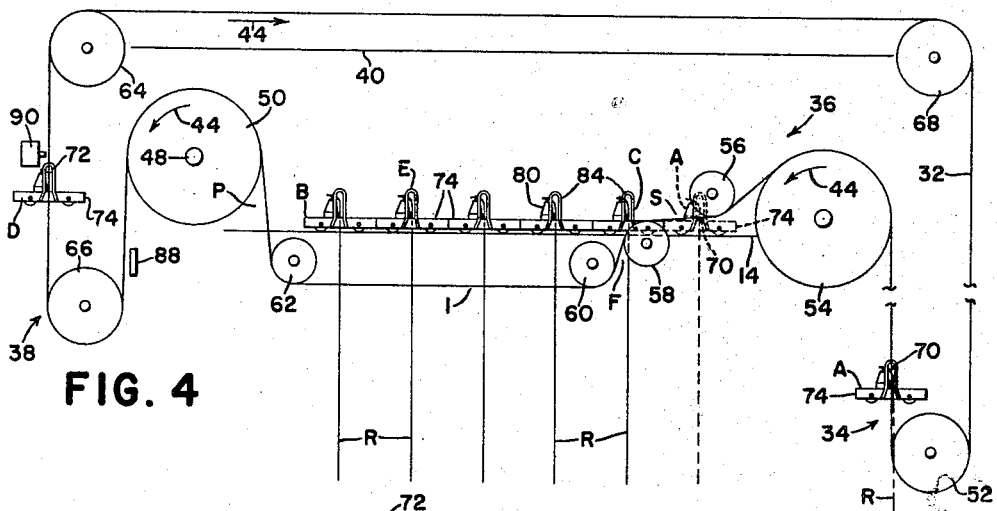
Figure 4 is a schematic view showing a loading stage of the apparatus and illustrating a transfer stage in broken lines.
Figure 8:
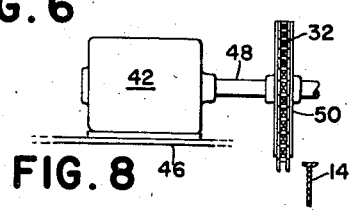
Figure 8 is a fragmentary view showing a representative electric motor drive for the conveyor.

The apparatus includes an endless conveyor element, here a pair of laterally spaced apart chains 32, which, for convenience, will be referred to mainly in the singular. This chain or conveyor extends from a loading zone, designated generally at 34, upwardly to the front end of the track 14 to a transfer zone 36, thence rearwardly along the track to an unloading zone 38 at the rear end of the track, and thence returns past an overhead track 40 to the loading zone. The chain may be driven by any suitable means, such as an electric motor 42 (Figure 8) to travel in the direction indicated by the arrows 44. The motor 42 is preferably carried as by a platform 46 at the upper left-hand corner of the structure as seen by the reader and has its shaft 48 connected to one of a pair of laterally spaced apart rotary members or sprockets 50 about which the chains 32 are trained in that area. Additional pairs of sprockets, herein referred to mainly in the singular for reasons already expressed, serve as rotary members, guides, control means etc. as will be hereinafter described in detail. One such set of sprockets 52 is located below the loading zone 34, four sets 54, 56, 58 and 60 are in the transfer zone 36, three sets are in the area of a pick-up zone P and the unloading zone 38 and, in addition to the sprockets 50, include sprockets 62, 64 and 66; and another set 68 is disposed above the transfer zone to cooperate with the set 64 to guide the return run of the chain. Sprockets other than those at 52, 64 and 68 are supported by sub shafts so that there are no cross shafts to interfere with travel of rugs conveyed by the apparatus. Because of the arrangement of the several sprockets, best shown in Figures 4–7, the chain travels in a prescribed path and causes two sets of chain-mounted connector portions or supports in the form of lugs 70 and 72 to follow the same path. Here again reference to the lugs is mainly in the singular, and so considered it will be seen that when one lug 70 is at the loading zone 34 the other lug 72, being spaced along the chain 32, will lie just beyond the unloading zone 38 (Figure 4). The lugs of each set project normally inwardly from the respective chains so as to releasably receive or establish temporary supporting connections with successive article carriers or carriages 74. Each carrier has laterally spaced apart roller-equipped members 76 rigidly cross-connected by a bar 78 on which is rigidly mounted a parallel article-receiving member or transverse pole 80 having upright sharpened pins 82 for receiving rugs, as at R, which are hung by their upper ends on the pins 82 in the loading zone so as to be suspended from the carriers. As the carriers are moved in the direction of the chain, the rugs trail the poles, which is significant from the standpoint of unloading or stripping, which will be described subsequently. Each rug will be partly penetrated by the pins 82 on a pole in such manner that lifting of the rug relative to the pole will result in its removal, or holding of the rug while the pole travels relatively downwardly will accomplish the same result.

Figures 2, 3:
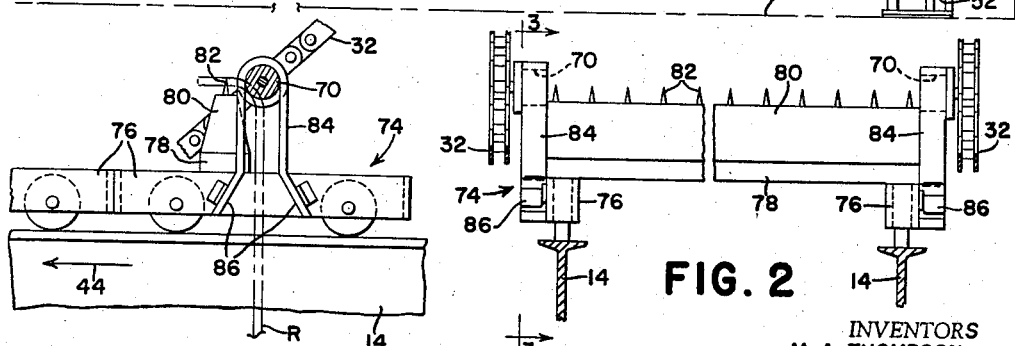
Figure 2 is an enlarged fragmentary section of the track and carrier means.
Figure 3 is a section on the line 3—3 of Figure 2.

Each carriage or carrier is equipped at opposite sides with a connector member in the form of an inverted U-shaped loop 84 having an open bottom provided by a pair of diverging legs 86 (Figure 3). Each loop has its closed end or top uppermost and is rigidly secured to its proximate carriage part 76 in any suitable manner, as by welding. Also as shown in Figure 3, the bar 78 and pole 80 are rearwardly of the pivot afforded when the lug 70 or 72 is received in the loop, so as to tilt the carriage in the proper direction to assume a level position when loaded with a rug.

In general, the operation of the apparatus involves the conveyance of successive loaded carriers from the loading zone 34 to the transfer zone 36, during which phase each carrier is connected to the chain via its loops 84 and a set of lugs 70 or 72. As each carrier is moved through the transfer zone, via the lug and loop connection, it is placed on the front end of the track 14. In this respect, the sprockets 54 and 56 function as transfer means, particularly as the chain passes over the sprocket 54 and under the sprocket 56. Because of the relatively large diameter of the sprocket 54, the lug 70 (or 72) is caused to follow a relatively elevated path, which facilitates placing of the carrier on the track so that its rollers readily ride on the I-beams. This arrangement avoids the need for expensive and complicated carrier guides, ramps, etc.

During the transfer operation, the lug-to-loop connection between the chain and carrier is retained until the carrier is moved through an advance or shift zone S, here measured between the sprockets 56 and 58. Thus, as the chain passes under the sprocket 56 and over the sprocket 58, it travels generally horizontally rearwardly and of course compels the lug 70 (or 72) to follow the same path. The vertical elongation of the carrier loops 84 enables the chain to be vertically displaced in the amount noted while still retaining the lug-to-loop connection. Stated otherwise, once the transfer is effected, the carrier rides the track and the chain-to-carrier connection is merely one enabling the chain to move the carrier along the track in the zone S.

The sprockets 56 and 58 operate as chain guide means and fore-and-aft spacing between them determines the length of the zone S and thus the amount that the carrier will move rearwardly via the lug-to-loop connection, and this, combined with the position of the next rearward sprocket 60, forms the basis of means effecting disengagement of the lug from the carrier loop. The sprocket 60, as will be noted, is lower than the sprocket 58, and hence the chain, passing over the sprocket 58 and under the sprocket 60, is directed downwardly through a disconnect zone F, compelling the lug of course to follow that path so that it escapes from the open bottom of the loop 84. The two sprockets 58 and 60 thus serve as chain control means effecting lug-loop disengagement. The chain extends rearwardly from the sprocket 60 to the first rear sprocket 62, which is at the same level as the sprocket 60 and the two combine to confine the chain in a coast or idle area or zone I at a level below that of the open bottom of the carrier loop 84, in which respect the sprocket 60 serves as a rear chain guide means. The chain passes thence upwardly and over the relatively large sprocket 50, thence downwardly and under the sprocket 66, and thence upwardly over the rear return sprocket 64, forwardly to the front return sprocket 68 and downwardly and about the loading zone sprocket 52.

The foregoing has proceeded on the basis of initially loading the track and explains the means whereby the first carrier is placed on the track. Ultimately, the track will contain a series of carriers disposed therealong in end-to-end abutting relation as the carriers accumulate when successively transferred to the front of the track by the means 54—56. As brought out above, the first carrier transferred to the track is shifted rearwardly by the lug-to-loop connection in an amount determined by the spacing between the guide means sprockets 56—58, and is then left on the track as the lug-to-loop connection is broken in the zone F by the chain control means afforded by the sprockets 58—60. The lug 70 is then free to return to the loading zone, initially without a carrier. However, since there are the two lugs 70 and 72, the latter reaches the loading zone 34 while the former is somewhat beyond the unloading zone 38, and the lug 72 will receive the next carrier, move it to the transfer zone 36, through the advance zone S and it will be disengaged at 58—60.

When the first carrier was shifted rearwardly at 58—60, it left a track space ahead of it for accommodating the second carrier and when the second carrier is transferred at 54—56 to this space, it abuts the front of the first carrier so that when it is advanced at 56—58, it shifts the first carrier along the track with it. Thus, each successive carrier transferred to the front of the track abuts the forwardmost previous carrier in the accumulating carrier or carriage series. The spacing between the sprockets 56 and 58 is equal to the length of a carrier and all carriers are the same. Hence, the carriers are incrementally shifted rearwardly and the rugs suspended therefrom are appropriately spaced for adequate drying. The length of the track determines the number of carriers acceptable thereby and this of course affects the drying time factor, which will be readily understood from the ensuing explanation of how the carriage first on the track, eventually becoming the rearwardmost carriage in the series, is picked off or removed from the track by the lug 70 (or 72) and is caused to pass through the unloading zone 38 for stripping of the rug therefrom by a stripper member 88.

Figure 6:
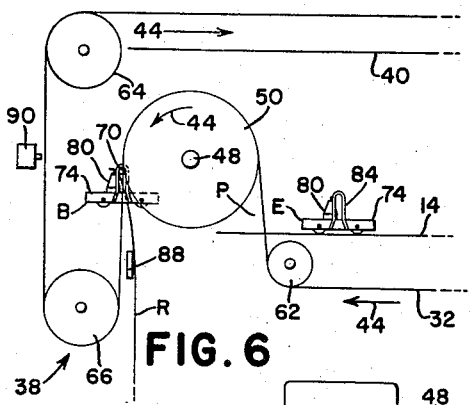
Figure 6 is a schematic view of the rear portion of the structure shown in Figures 4 and 5 and showing a pre-unloading stage.
Figure 7:
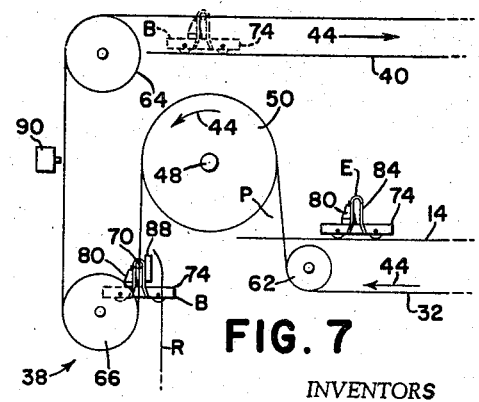
Figure 7 is similar to Figure 6 but shows the unloading stage.

As the carrier series is shifted rearwardly via each succeeding carrier added at the front of the track at 36, carrier-to-track friction and the weight of the rugs keeps the carriers from coasting and hence the incremental shifting is confined to carrier lengths until the carrier first on the track reaches an area in which its loop 84 lies in the zone P in which the chain travels upwardly from the sprocket 62 to the sprocket 50, at which time these two sprockets function as rear chain control means compelling the lug 70 (or 72) to enter the open bottom of the carrier loop 84 and thus to pick up the carrier via the closed top of the loop, whereby the carrier is lifted from or picked off of the track to travel thence about the sprocket 50 and down to the sprocket 66. As the lug 70 and its carrier travel over and about the sprocket 50, the depending rug travels also rearwardly, depending between the paired sprockets 50, since there is no cross shaft between them. In this respect, the rug trails the carrier pole 80 so that the pole is behind the stripper 88 and the rug is ahead of the stripper (Figure 6). Therefore, as the carrier descends at 50—66, the stripper engages under the upper portion of the rug adjacent to the pins 82 and strips the rug from the pins, whereupon the rug drops to the floor 28 for manual or other removal from the drying room.

As the unloaded carrier travels beyond the unloading zone and between the sprockets 66 and 64, it may actuate an appropriate control means, such as an electric switch shown schematically at 90, for stopping the chain. It is preferred that the spacing of the lugs 70 and 72 on the chain is such that when one lug-supported carrier actuates the switch 90 to stop the chain, another lug-supported carrier will be in the loading zone 34. Another switch (not shown) manually operated and suitably wired with the switch 90, may be used to re-start the chain to complete another cycle.

Figure 4 illustrates, schematically, a condition in which the track is fully loaded with a series of carriers or carriages, each suspending a rug to be dried, and another rug-suspending carrier A is starting up from the loading zone 34. In this figure, the rearwardmost carrier B is short of the pick-up area or zone P through which the chain travels from the sprocket 62 to the sprocket 50. All carriers in the series have their loop bottoms at a common level above that of the stretch of chain in the zone I between the guide sprockets 60 and 62. Dotted lines in the figure show the carrier A transferred to the front of the track ahead of and abutting the forwardmost carrier C of the series. An empty, previously removed carrier 74 is shown at D, being returned by the lug 72.

Figure 5:
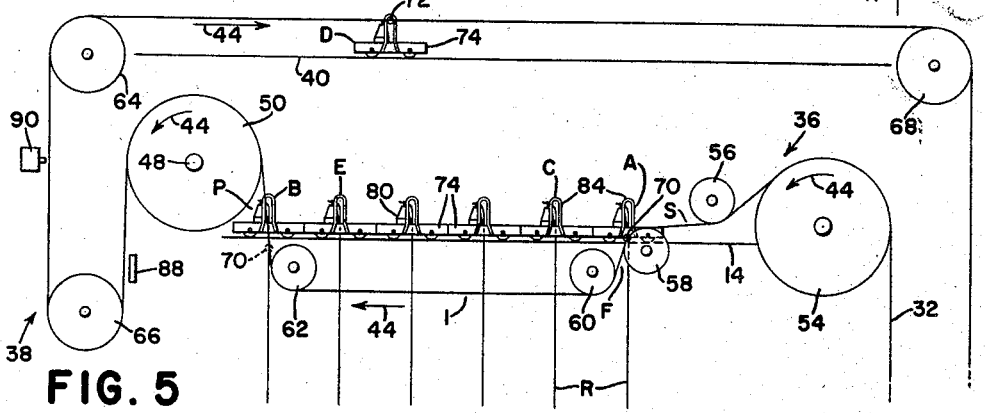
Figure 5 is similar to Figure 4 but shows an advancing stage and further shows a pick-off stage of the picked-off lug in broken lines.

Figure 5 shows that the previously transferred carrier A has been shifted rearwardly by the means 56—58 and through the distance S (one carrier length) and the entire series is therefore shifted rearwardly so that the rearwardmost carrier B has its loop 84 in the pick-up zone P, where it is in intersected relation to the path of the chain between the sprockets 62 and 50. This figure also shows (in full lines) that the lug 70 is about to escape the loop 84 of the carrier A, and the subsequent position of the lug 70, after it bypasses the carrier series, is shown in dotted lines just below the loop 84 of the carrier B.

Figure 6 shows that the lug 70 has picked off the carrier B, leaving the next rearwardmost carrier E short of the pick-up area P. As another carrier is added at the front of the track, the carrier E will of course advance to the pick-up zone P and the cycle will be repeated, each carrier that is picked off being stripped or unloaded (full lines, Figure 7) via the return track 40 and front return sprocket 68 to the loading zone to be loaded with a rug to be dried.

As will be apparent, the apparatus is extremely simple and uncomplicated for the task it performs. It embodies the semi-automatic features of transfer, shift and pick-off, plus control of the chain drive to facilitate loading. The timing of the transfer and pick-off functions is adequately related to the speed of the chain to establish proper drying time, which is of course a variable that does not affect the principles of the invention.

Features other than those outlined herein will readily occur to those versed in the art, as will modifications of the preferred embodiment disclosed, all of which may be achieved without departure from the spirit and scope of the invention.

What is claimed is:

1. Apparatus of the class described, comprising: a horizontal track having front and rear ends; a loading zone apart from the track; an endless conveyor chain extending from the loading zone to and from front to rear along the track and back to the loading zone and having a lug thereon; means driving and supporting the chain to cause the lug to travel from the loading zone to the front end of the track, thence generally along the track to the rear end thereof and thence back to the loading zone; a series of similar carriages on and disposed along the track in end-to-end abutting relationship and clear of the chain and respectively having connector loops thereon in the form of inverted U's having open bottoms at a common level; a similar additional carriage adapted to be suspended by its loop from the lug at the loading zone for travel with the lug to the front end of the track; transfer means at the front end of the track operative to direct the chain so as to compel the lug to transfer the additional carriage to the track ahead of and in abutting relation to the front carriage of said series and with the open bottom of its loop at the aforesaid level; front chain guide means behind the transfer means and operative thence to direct the chain rearwardly to compel rearward movement of the lug and lug-engaged additional carriage whereby said carriage series is shifted bodily rearwardly; front chain control means rearwardly of said guide means for directing the chain thence downwardly to a lower level than that of the loop bottoms so that the lug escapes the bottom of the loop of the additional carriage; rear chain guide means operative to confine the chain and lug to travel rearwardly at said lower level in by-passing relation to the carriages; and rear chain control means behind the rear guide means and operative to direct the chain upwardly in the area of the rearwardmost carriage of said rearwardly shifted series to compel the lug to travel upwardly into the open bottom of the loop of said rearwardmost carriage to remove the latter from the track for return to the loading zone.

2. The invention defined in claim 1, in which: all carriages are of the same length measured lengthwise of the track; and the front chain guide means is operative to direct the chain rearwardly in such amount that the lug causes the additional carriage to shift the series rearwardly a distance generally equal to a carriage length.

3. The invention defined in claim 1, in which: each carriage has thereon means for receiving an article at the loading zone and for supporting said article while said carriage is movable to the track and along the track; an unloading zone is provided beyond the rear end of the track, and an element in said unloading zone is operative to remove the article from the rearwardmost carriage after said carriage is removed from the track by the lug under action of the rear chain guide means.

4. The invention defined in claim 3, in which: the article-receiving means includes a support on each carriage extending rigidly therefrom in a direction normal to the track so as to releasably suspend an article from said support in trailing relation thereto; additional chain guide means is operative in the unloading zone to direct the chain and lug and lug-carried carriage downwardly beyond the rear chain control means; and said element projects into the path of the article suspended from said support so as to strip said article from the support as said carriage moves downwardly past said element.

5. The invention defined in claim 1, including: a second lug on the chain and spaced therealong from the first-mentioned lug by such amount that when one lug is operating to remove the rearwardmost carriage from the track the other lug is approaching the loading zone.

6. The invention defined in claim 5, including: control means operative by said one lug beyond the rear chain guide means for causing stopping of the chain when said other lug is at the loading zone.

7. Apparatus of the class described, comprising: a horizontal track having front and rear ends; a loading zone apart from the track; an endless conveyor chain extending from the loading zone to and from front to rear along the track and back to the loading zone and having a connector portion thereon; means driving and supporting the chain to cause the connector portion to travel from the loading zone to the front end of the track, thence generally along the track to the rear end thereof and thence back to the loading zone; a series of similar carriages on and disposed along the track in end-to-end abutting relationship and clear of the chain and respectively having connector means thereon; a similar additional carriage adapted to be suspended by its connector means from the chain connector portion at the loading zone for travel with the connector portion to the front end of the track; transfer means at the front end of the track operative to direct the chain so as to compel the connector portion to transfer the additional carriage to the track ahead of and in abutting relation to the front carriage of said series; front chain guide means behind the transfer means and operative thence to direct the chain rearwardly to compel rearward movement of the connector portion and additional carriage engaged thereby whereby said carriage series is shifted bodily rearwardly; means operative upon said rearward shifting for effecting disengagement between the connector portion and the connector member of the additional carriage; means operative during subsequent rearward movement of the disengaged connector portion to prevent engagement thereof with the carriages other than the rearwardmost carriage of the rearwardly shifted series; and means at the rear end of the track and operative to cause the connector portion to engage the connector member of said rearwardmost carriage to remove the latter from the track for return to the loading zone.

8. Apparatus of the class described, comprising: a horizontal track having front and rear ends; a loading zone apart from the track; an endless conveyor element arranged and driven to extend from the loading zone to the front of the track and thence from front to rear generally along the track and thence back to the loading zone; an article carrier support on the element for travel therewith and having a starting position at the loading zone; a plurality of track-supported similar article carriers movable along the track but initially temporarily supported by the track with one of said carriers being rearwardmost and adjacent to the rear end of the track, each carrier having a connector member and said connector members being similar; a similar article carrier other than the track-supported carriers and disposed at the loading zone and having a connector member similar to the aforesaid members, said connector member on said other carrier being releasably engaged by the support to travel therewith to the front end of the track; transfer means at the front end of the track to direct the element and support toward the track to effect transfer of said other carrier to the track ahead of the track-supported carriers; means operative thence to cause the support to disengage from the connector member on said other carrier and to cause the element and support to travel generally along the track clear of all carriers on the track; and means operative upon rearward travel of the support to the rear end of the track for directing the element back toward the track to effect engagement of the support with the connector member of the rearwardmost carrier so as to remove said rearwardmost carrier from the track for return to the loading zone.

References Cited in the file of this patent
UNITED STATES PATENTS

| | | |
|---|---|---|
| 892,543 | Newerf | July 7, 1908 |
| 903,208 | Leonard | Nov. 10, 1908 |
| 1,875,966 | Webb et al. | Sept. 6, 1932 |
| 2,048,937 | Larson | July 28, 1936 |
| 2,344,155 | McBride et al. | Mar. 14, 1944 |
| 2,627,968 | Thompson | Feb. 10, 1953 |
| 2,771,175 | DaCasta | Nov. 20, 1956 |
| 2,816,643 | Klamp | Dec. 17, 1957 |